L. A. MYERS.
LUBRICATING BEARING FOR CENTRIFUGAL PUMPS.
APPLICATION FILED AUG. 30, 1915.
1,191,452.
Patented July 18, 1916.
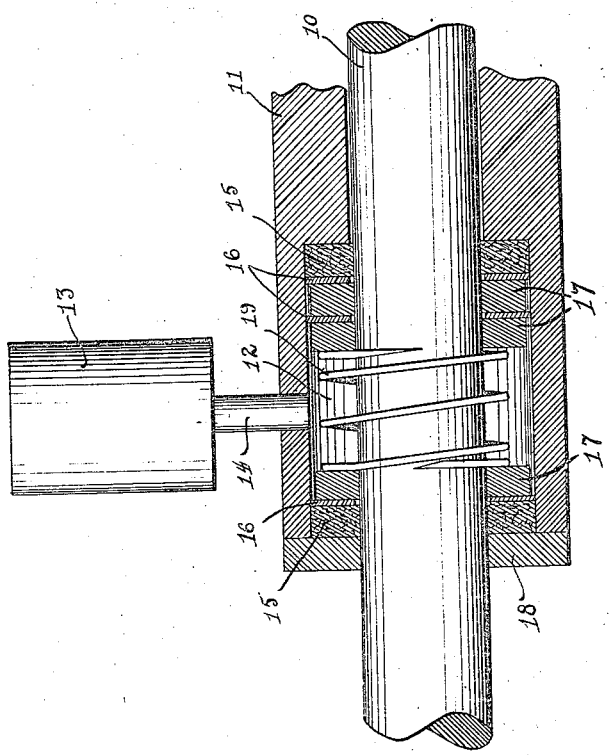

UNITED STATES PATENT OFFICE.

LAWRENCE A. MYERS, OF PORTERVILLE, CALIFORNIA.

LUBRICATING-BEARING FOR CENTRIFUGAL PUMPS.

1,191,452.  Specification of Letters Patent.  Patented July 18, 1916.

Application filed August 30, 1915. Serial No. 48,083.

*To all whom it may concern:*

Be it known that I, LAWRENCE A. MYERS, a citizen of the United States, residing at Porterville, in the county of Tulare and State of California, have invented certain new and useful Improvements in Lubricating-Bearings for Centrifugal Pumps, of which the following is a specification.

This invention relates to a bearing for the shaft of a centrifugal pump and the main object of the invention is to provide a bearing so constructed that air will be excluded from the cylinder and at the same time a certain amount of lubricating oil admitted to the cylinder.

Another object of the invention is to so construct this bearing that excessive wear upon the washers will be prevented and thus the life of the bearing prolonged.

Another object of the invention is to provide a bearing in which the washers will be very tightly held in place but permitted to have necessary movement as the shaft rotates.

This invention is illustrated in the accompanying drawings, wherein there is shown the improved bearing in position upon the driving shaft of a centrifugal pump.

The shaft 10 which may be rotated by any suitable means extends through the sleeve 11, which sleeve is to extend from the cylinder or casing of a standard centrifugal pump. The outer end portion of this sleeve is provided with the housing 12 in which the improved packing will be mounted. It is desired to have this chamber filled with oil and therefore there has been provided an oil cup 13 the spout 14 of which communicates with the interior of the chamber 12 thus feeding oil to the chamber.

Within the chamber or packing box 12 there are positioned the washers 16 and 17, the washers 15 being formed of felt or other similar material, the washers 16 being formed of polished steel and the washers 17 being formed of bronze or other tough bearing material. The felt washers 15 are provided to fill up any irregularities in the end of the packing box thus forming a tight closure to prevent danger of leakage between the cap 18 and the end of the sleeve 11. This cap 18 can be secured in any suitable manner desired. It should be noted that the steel washers 16 fit snugly against the walls of the packing box but are in spaced relation to the shaft 10 thus preventing the inner edge portion of these washers 16 from being worn by engagement with the rotating shaft. It should also be noted that the bronze washers 17 fit snugly upon the shaft 10 but have their outer edge portions in spaced relation to the walls of the packing box and therefore the washers 16 and 17 can have sliding movement with respect to each other in case of vibration. In order to hold the washers in the proper position a spring 19 has been placed about the shaft with its end portions engaging two of the washers and thus exerting a pressure to hold the washers in close engagement with each other. These washers will therefore form baffle plates so that when the oil passes into the pump casing it must work around the washers and through the felt washers to pass into the sleeve 11 about the shaft 10. Therefore there will be a thin covering of oil around the washers and shaft serving to exclude air and thus producing air tight packing which will effectively prevent air from entering the pump casing.

As the shaft 10 is rotated the bronze washers 17 will rotate with the shaft and due to their frictional engagement with the steel washers 16 these washers will be caused to rotate slowly. The contacting faces of the washers 16 and 17 will therefore be kept well lubricated by the rotation of the washers thus providing the thin film of oil which serves as means for excluding air from the pump.

I have therefore provided a bearing or packing box for the shaft of a centrifugal pump which is so constructed that a tight bearing will be provided and thus air excluded from the pump casing. I have also provided a bearing or packing so constructed that vibration of the shaft will not interfere with the effectiveness of the packing since the washers 17 can have transverse movement relative to the washers 16. It will also be noted that I have provided a packing which is very simple in construction but which is very effective in operation and which will not very readily wear out or quickly need repair.

What is claimed is:—

1. In a machine of the character described, a sleeve having its passageway provided with an enlarged portion forming a packing box, a rotatable shaft extending through said sleeve and packing box, an oil supply communicating with said packing box intermediate its length, packing positioned in said packing box at the ends thereof about said shaft, steel washers positioned in said packing box around said shaft and having their outer edges engaging the walls of the packing box and having their inner edges positioned in spaced relation to the shaft, bronze washers positioned in said packing box and fitting snugly upon said shaft to turn with the same and having their outer edge portions positioned in spaced relation to the walls of the packing box, and resilient means positioned upon said shaft and holding the washers in frictional engagement upon opposite sides of the oil supply whereby the steel washers will turn with the bronze washers.

2. In a machine of the character described a sleeve provided with a packing box, a rotatable shaft extending through said sleeve and packing box, a lubricating container communicating with said packing box, washers of relatively hard material positioned in said packing box about said shaft and having their outer edge portions engaging the walls of the packing box and having their inner edge portions positioned in spaced relation to said shaft, washers of relatively tough material positioned upon said shaft within said packing box and turning with the shaft and having their outer edge portions positioned in spaced relation to the walls of said packing box, and resilient means engaging certain of said washers to hold the washers in contacting engagement whereby frictional engagement will cause said tough washers to slowly rotate said hard washers.

3. A device of the character described including a packing box, a rotatable shaft extending through said packing box, fabric washers positioned in the end portions of said packing box about said shaft, washers of relatively hard metal fitting snugly in said packing box about said shaft and having their inner edge portions positioned in spaced relation to said shaft, washers of relatively tough metal fitting snugly upon said shaft within said packing box and positioned in spaced relation to the walls of the packing box, and resilient means holding said washers in contacting relation to provide frictional engagement thereby turning said tough washers.

4. A device of the character described including a packing box, a rotatable shaft extending through said packing box, washers of relatively hard material fitting snugly in said packing box and loosely about said shaft, washers of relatively tough material fitting snugly upon said shaft and loosely within said packing box, and resilient means holding said washers in contacting relation to provide frictional engagement thereby turning said hard washers with said tough washers.

In testimony whereof I affix my signature in presence of two witnesses.

LAWRENCE A. MYERS.

Witnesses:
HOMER MYERS,
L. ROHLECK.